United States Patent Office 3,133,117
Patented May 12, 1964

3,133,117
SULFONE INHIBITORS IN AROMATIC SULFONATIONS
Laszlo Bollyky, North Brunswick, Stanley M. Davis, Bridgewater Township, Somerset County, and John P. Dundon, Branchburg Township, Somerset County, N.J., assignors to American Cyanamid Company, New York, N.Y., a corporation of Maine
No Drawing. Filed June 6, 1960, Ser. No. 33,880
5 Claims. (Cl. 260—505)

This invention relates to the sulfonation of monnuclear aromatic hydrocarbons, particularly to the continuous production of anhydrous mononuclear arene and alkylarene sulfonic acids. Still more specifically, the invention is concerned with an improved method for continuous direct sulfonation of aromatic hydrocarbons with sulfur trioxide. The process is still further characterized by the utilization of novel inhibiting agents whereby the sulfonic acids so produced are low in sulfones.

Mononuclear aromatic sulfonic acids, particularly the monosulfonic acids, are industrially useful for many purposes. These include, among others, use as catalysts for such type reactions as polymerization, esterifications, alkylations, hydrolyses, condensations, and the like; as detergents and emulsifying agents; and as intermediates in the preparation of phenolic compounds, dyes and pharmaceuticals. Some uses require that the sulfonic acid be of high quality. For example, a very high grade of para-toluene sulfonic acid is desired in the manufacture of para-cresol, an intermediate in the manufacture of 2,6-di-tertiary-butylcresol, a well-known antioxidant.

In the past, sulfonation of mononuclear aromatic hydrocarbons conventionally was carried out with sulfuric acid and with oleum. These procedures had a number of serious disadvantages. Formation of water during reaction resulted in incomplete reactions and the presence of residual sulfuric acid in the product. Moreover, whenever the hydrocarbon structure was such as to permit formation of isomers an isomeric mixture was obtained. In the case of toluene, for instance, although the para-isomer was usually predominant, high proportions of meta-toluen sulfonic acid were produced.

More recently, direct sulfonation with sulfur trioxide was proposed. Theoretically such practice would be expected to overcome most of such difficulties. When tried, however, large amounts of aromatic sulfones were formed, in some cases amounting to as much as 20-25% of the reaction product mixture. Use of solvents for the trioxide, particularly liquid sulfur dioxide, has been suggested as a means of lowering the sulfone content. However, the sulfonic acids so produced still contain an undesirably high sulfone content. Moreover, in actual practice such procedure generally was limited to batch operation.

Where as noted above the production of isomeric monosulfonic acids can occur, it is usually desirable to so conduct the sulfonation that one isomer is predominantly formed. For instance, as noted above, when a para-toluenesulfonic acid is required, as for the production of para-cresol, production of ortho- and/or meta-isomers should be minimized to insure good yields, both of the sulfonic acid and of the final product cresol. Meta-cresol, for example is particularly difficult to separate from para-cresol. In U.S. Patent No. 2,828,333, the simultaneous addition to the reactor of a solution of sulfur trioxide in sulfur dioxide, and an equivalent amount of toluene is shown to produce a substantial increase in the desired para-isomer.

There is still a further difficulty when a monosulfonic acid constitutes the desired product. Sulfur trioxide is a powerful sulfonating agent which reacts rapidly with aromatic hydrocarbons. Its use results in product monosulfonic acids containing large amounts of disulfonic acids. Industrial acids are usually thus contaminated, commercially-available para-toluene-sulfonic acid, for example, often containing some three to four or more percent of disulfonic acids. As in the case of sulfones, formation of disulfonic acids not only decreases the potential yield of monosulfonic acid but also introduces a contaminant into the product.

Therefore, while continuous processes for the sulfonation of aromatic hydrocarbons are not unknown, they are generally satisfactory and practical in only a relatively few industrial applications. Illustratively, again, continuous sulfonation of toluene with 98 percent sulfuric acid is known, but the product contains free sulfuric acid. A continuous sulfonation-extraction process using benzene, 100 percent sulfuric acid and sulfur trioxide is known but requires repeated cycling of the benzene. Continuous sulfonation of benzene with sulfur trioxide results in a high (30 percent) sulfone formation.

A process permitting continuous production of para-toluene sulfonic acid having a low disulfonic acid content forms a part of the subject matter of application Serial No. 33,881, now abandoned, filed of even date by one of the present inventors, J. P. Dundon; together with P. C. Kimball and G. L. Wiesner. As disclosed therein, at a temperature below zero down to minus 20° C., a flowing stream of the hydrocarbon in sulfur dioxide is established. Only thereafter is a stream of sulfur trioxide introduced thereinto in controlled amounts, the product being withdrawn after a definite reaction period. However, even this otherwise desirable procedure did not insure a product having a sulfone content as low as desired for some purposes.

It is, therefore, a principal object of the instant invention to provide a process for the manufacture of mononuclear aromatic sulfonic acids which is not subject to these objections. Such a process should be capable of continuously producing the desired sulfonic acid with a sulfone content from below about 2.75 percent down to about 0.5 percent, or less. Moreover, the process should be capable of yielding monosulfonic acids substantially free of polysulfonic acids when so desired. It should also enable the production of such para-isomers as para-toluene monosulfonic acid and para-ethylbenzene monosulfonic acid with a minimized content of ortho- and meta-isomers.

These objects have been surprisingly successfully accomplished by the discovery of a group of relatively simple but novel and effective inhibitors of the formation of sulfones. These inhibitors comprise nitric acid and the oxygen-containing acids of phosphorus. Their effectiveness is highly surprising in view of the fact that such other inorganic acids as sulfuric, hydorchloric and boric acids are quite ineffective for the purpose.

Use of the nitric and phosphoric acid inhibitors of the present invention is found to be very effective in sulfonation with sulfur trioxide in the preparation of mono- and poly-sulfonic acids of a wide variety of aromatic hydrocarbons, usually, but not necessariiy, using sulfur dioxide as a solvent. These include, for example, such hydrocarbons as benzene, toluene, xylenes, ethylbenzene, isopropylbenzene, naphthalene, halogenated benzenes, such as the chloro- and bromobenzenes and monosulfonated derivatives thereof. They are particularly useful in forming monosulfonic acids in the procedure of the above-noted copending application, when a very low sulfone content is desirable, in the product therefrom.

In general, the same considerations apply when using nitric as when using a phosphoric acid. The former has no particular advantages over the latter. Since the latter generally offers fewer problems of equipment corrosion, they are perhaps somewhat preferable. Accordingly, they will be taken as illustrative for the purposes of this discussion.

A variety of phosphoric acids are commercially available. Substantially any of them may be used. Orthophosphoric acid ($H_3PO_4$) is perhaps the most readily available and is excellent for the purpose. Others which are available and have been found useful include metaphosphoric acid ($HPO_3$) and polyphosphoric acids. A number of organophosphoric acids such as phytic acid and the like also may be used. In general they are more expensive and offer no advantages which warrant the added cost involved in their use.

Usefulness of the acid in suppressing sulfone formation appears to be independent of the exact procedure used in contacting the reactants. For example, they are not deterred in action by the presence or absence of such previously proposed solvents as liquid sulfur dioxide and ethylene tetrachloride. The acid may be introduced with any of the reaction components so long as it is present in the reaction zone where actual sulfonation takes place.

A sufficient amount of acid must be used. The amount of sulfone produced is dependent on the amount of acid present. In general, it should be provided (calculated on a 100% basis) in amounts of from about 0.001 part to about 0.05 part per part by weight of sulfur trioxide. The strength at which the acid is supplied ordinarily is not a factor, it being the actual amount of real acid present which is the determining factor. Since water, when present, is not only objectionable for the reasons noted above, but also consumes sulfur trioxide with no useful result, it is disadvantageous to use dilute acid solutions. Some water is unavoidably present in the commercially available concentrations of the phosphoric acids. However, the available concentrated acids are useful and their use is economically feasible.

The invention will be more fully described in conjunction with the following illustrative examples. Therein, all parts and percentages are by weight and temperatures are in degrees centigrade unless otherwise noted. Therein, also, the reported sulfone content of the anhydrous acids is obtained by dissolving the sulfonation products in water, neutralizing the solution to a pH of about 8 with aqueous sodium hydroxide, extracting the aqueous solution with ether and/or chloroform, evaporating the extract to dryness and weighing the residue.

EXAMPLES 1–5

At a temperature of about minus 10° C., a solution of 80.1 parts (1.0 mol) of sulfur trioxide in 145 parts of liquid sulfur dioxide and a solution of 1.0 mol of the aromatic hydrocarbon in 285 parts of sulfur dioxide are added simultaneously to 185 parts of sulfur dioxide containing 1.7% of 85% aqueous phosphoric acid ($H_3PO_4$), based on the sulfur trioxide used. When addition is completed, sulfur dioxide is evaporated by passing dry air through the reaction mixture while raising the temperature to 40–60° C. In a similar fashion, sulfonation of several different hydrocarbons are carried out, with and without the phosphoric acid. Illustrative results are compared in the following table.

*Table I*

EFFECT OF $H_3PO_4$ (85%) ON SULFONE FORMATION

| Example No. | Hydrocarbon | No. of Parts | No $H_3PO_4$, percent Sulfone [1] | With $H_3PO_4$ [2], percent Sulfone [1] |
|---|---|---|---|---|
| 1 | Benzene | 78.1 | 16.1 | 2.3 |
| 2 | Toluene | 92.1 | 6.6 | 0.8 |
| 3 | Ethylbenzene | 106.2 | 11.6 | 1.1 |
| 4 | Isopropylbenzene | 120.2 | 2.8 | 0.6 |
| 5 | Chlorobenzene | 112.6 | 22.5 | 1.9 |

[1] Weight percent sulfone based on weight of total product.
[2] 1.7% of 85% aqueous $H_3PO_4$, based on weight of sulfur trioxide.

EXAMPLES 6–11

Using toluene as the hydrocarbon, the procedure of Example 2 is repeated except that the amount of 85% aqueous phosphoric acid ($H_3PO_4$) is varied from 0% to 6.8%, based on the weight of the sulfur trioxide. Illustrative results showing the effect of increasing the amount of inhibitor are shown in Table II.

*Table II*

EFFECT OF VARYING AMOUNTS OF 85% $H_3PO_4$ ON SULFONE FORMATION DURING SULFONATION OF TOLUENE

| Example No. | $H_3PO_4$ (percent) | Sulfone Content (percent) [1] |
|---|---|---|
| 6 | None | 6.6 |
| 7 | 0.3 | 2.1 |
| 8 | 1.0 | 1.0 |
| 9 | 1.7 | 0.8 |
| 10 | 3.4 | 0.7 |
| 11 | 6.8 | 0.5 |

[1] Weight percent of sulfone based on weight of total product.

EXAMPLES 12–14

The procedure of Example 8 is repeated with the amount of real phosphoric acid being held constant at 1.0% of the weight of sulfur trioxide but the concentration of the aqueous acid solution being varied from 50% to 100%. The amount of sulfur trioxide used is adjusted to compensate for the amount of water introduced with the phosphoric acid. Typical results are shown in Table III.

*Table III*

| Example No. | Concentration of $H_3PO_4$ (percent) | Sulfone Content (percent) [1] |
|---|---|---|
| 12 | 100 | 1.4 |
| 13 | 85 | 1.0 |
| 14 | 50 | 1.1 |

[1] Percent by weight of whole product.

EXAMPLE 15

To illustrate that solution of sulfur trioxide in a solvent is not essential, a solution of 92.1 parts (one mol) of toluene in 145 parts of liquid sulfur dioxide is added simultaneously with 80.1 parts (one mol) of sulfur trioxide to 470 parts of sulfur dioxide containing 1.7% by weight of 85% aqueous phosphoric acid ($H_3PO_4$) based on the weight of the sulfur trioxide at a temperature of about minus 10° C. Sulfur dioxide then is removed by evaporation, using a stream of dry air, the temperature increasing to about 40° C. The sulfone content of the product is about 1.1%. This result compares favorably with that obtained in Example 2.

EXAMPLE 16

To illustrate the use of a solvent other than liquid sulfur dioxide, a solution of 80.1 parts (one mol) of liquid sulfur trioxide in 140 parts of ethylene tetrachloride and a solution of 92.1 parts (one mol) of toluene in 275 parts of ethylene tetrachloride are added simultaneously to 185 parts of ethylene tetrachloride containing 1.7% of 85% aqueous phosphoric acid ($H_3PO_4$) based on the weight of the sulfur trioxide. When addition is complete, the ethylene tetrachloride is removed by distillation. The sulfone content of the whole product is 2.9%.

EXAMPLE 17

For purposes of comparison, Example 16 is repeated except that the phosphoric acid is omitted. The sulfone content of the product is 4.9%.

EXAMPLE 18

At about 0° C., 80.1 parts (one mol) of liquid sulfur trioxide is slowly added to 92.1 parts (one mol) of toluene containing 1.7% of 85% aqueous phosphoric acid ($H_3PO_4$) based on the weight of the sulfur trioxide. When addition is complete, the reaction mixture is allowed to warm slowly to 30° C., and dry air is then bubbled through the charge for about 15 minutes. The sulfone content of the product is about 8%.

EXAMPLE 19

Example 18 is repeated with no phosphoric acid present. The sulfone content is 10.9%.

Comparison of the results of Examples 18 and 19 indicates that the phosphoric acid also has an inhibitory action on the formation of sulfone when no solvent is used in the sulfonation of toluene with liquid sulfur trioxide.

EXAMPLE 20

The procedure of Example 2 is repeated with the phosphoric acid ($H_3PO_4$) replaced by 3.5% of meta-phosphoric acid ($HPO_3$) based on the sulfur trioxide. The product contained 0.8% of sulfone. This result compares favorably with that in Example 2.

EXAMPLE 21

At about minus 10° C., a solution of 120.1 parts (1.5 mol) of sulfur trioxide in 655 parts of sulfur dioxide is added to a solution of 138.2 parts (1.5 mol) of toluene in 270 parts of sulfur dioxide containing 9.5% polyphosphoric acid (prepared by mixing equal parts of 85% aqueous phosphoric acid ($H_3PO_4$) and phosphoric anhydride). Sulfur dioxide is then evaporated and the temperature raised to about 45° C. The sulfone content of the product is 7.2%.

EXAMPLE 22

The procedure of Example 21 is repeated except that the polyphosphoric acid is omitted. The sulfone content is 12.5%, which shows that polyphosphoric acid, prepared as described above, has an inhibitory action on the formation of sulfones.

EXAMPLES 23–25

The procedure of Example 2 is followed but substituting varied amounts of phytic acid, $C_6H_6(OPO_3H_2)_6$, for the phosphoric acid. Illustrative results are shown below in Table IV.

*Table IV*

| Example No. | Phytic Acid (percent) | Sulfone Conte (pent rcent) |
|---|---|---|
| 23 | 0.0 | 6.6 |
| 24 | 3.5 | 1.8 |
| 25 | 0.8 | 4.5 |

EXAMPLES 26–31

The procedure of Example 2 was followed substituting nitric acid, in varied amounts for the phosphoric acid. Illustrative results are shown in Table V.

*Table V*

| Example No. | Percent Concentration of $HNO_3$ | Percent $HNO_3$ | Sulfone Content (Percent) |
|---|---|---|---|
| 26 | | None | 6.6 |
| 27 | [1] 100 | 1.2 | 2.2 |
| 28 | [1] 100 | 0.6 | 1.0 |
| 29 | [1] 100 | 0.3 | 1.8 |
| 30 | [2] 96 | 0.9 | 1.6 |
| 31 | 69 | 1.0 | 1.0 |

[1] Nitric acid (red fuming), "Baker Analyzed Reagent."
[2] Nitric acid (96% real $HNO_3$), Technical Grade.

EXAMPLE 32

The procedure of Examples 1–5 is repeated using p-toluenesulfonic acid as the hydrocarbon. The product, toluenedisulfonic acid, is isolated in a similar fashion.

EXAMPLE 33

The procedure of Example 2 is repeated using a solution of 160.1 parts (2.0 mols) of sulfur trioxide in 290 parts of liquid sulfur dioxide. The product, toluenedisulfonic acid is isolated in a similar fashion.

We claim:
1. In a process of sulfonating an aromatic hydrocarbon selected from the group consisting of benzene, naphthalene, chlorobenzene and the mono- and di-alkyl benzenes wherein the alkyl group contains from 1–4 carbon atoms, in which process said hydrocarbon is admixed with sulfur trioxide and resultant mixture is agitated at relation temperature for sufficient time to produce at least one product hydrocarbon sulfonic acid, said product sulfonic acid being produced in admixture with by-product sulfones;

the improved method of inhibiting said by-product sulfone formation which comprises: prior to reaction, adding to the reaction mixture an acid selected from the group consisting of nitric acid and the oxygen-containing acids of phosphorus, said acid being added in amount by weight of from about 0.1 to about 5.0 parts per 100 parts of sulfur trioxide.

2. A process according to claim 1 in which the sulfonation reaction is carried out in solution in liquid sulfur dioxide.

3. A process according to claim 1 in which said hydrocarbon is dissolved in liquid sulfur dioxide and thereafter sulfur trioxide is added thereto.

4. A process according to claim 3 in which said acid is added substantially simultaneously with the sulfur trioxide.

5. A process according to claim 1 in which said acid is orthophosphoric acid.

References Cited in the file of this patent

UNITED STATES PATENTS 2,831,020    Norwood et al. _____ Apr. 15, 1958

FOREIGN PATENTS 669,899    Great Britain _____ Apr. 9, 1952
536,940    Canada _____ Feb. 5, 1957